United States Patent [19]
Dave

[11] 3,891,412
[45] June 24, 1975

[54] TRIMETHYLOLPROPANE USE OF MACRORETICULAR POLYMERS OF TRIMETHACRYLATE FOR MAKING CHROMATOGRAPHIC SEPARATIONS

[75] Inventor: Shashi Bhaishanker Dave, Lakewood, Colo.

[73] Assignee: Johns-Manville Corporation, Denver, Colo.

[22] Filed: May 6, 1974

[21] Appl. No.: 467,165

[52] U.S. Cl. ............................ 55/67; 55/386
[51] Int. Cl. ........................... B01d 15/08
[58] Field of Search ........ 55/67, 386, 74; 210/31 C, 210/198 C

[56] References Cited
UNITED STATES PATENTS
3,358,423  12/1967  Amir ........................ 55/67
3,488,922  1/1970   Kirkland .................... 55/67

OTHER PUBLICATIONS
Gas and Liquid Chromatography Abstracts, 1970, pub. by The Institute of Petroleum, London, Eng., Abstract 222, an abstract of Z. Anal. Chem., 241 32(1968).

*Primary Examiner*—John Adee
*Attorney, Agent, or Firm*—Robert M. Krone; John H. Miller

[57] ABSTRACT

Disclosed is a method of separating a mixture of organic compounds into its individual compound components by passing vapors of the mixture through a packed column of porous resin particles using conventional chromatographic apparatus and techniques wherein porous particles of a macroreticular polymer of trimethylolpropane trimethacrylate are used in the packed column. One mixture of organic compounds having similar boiling points, but having different polarities, that such a column is useful in separating is a mixture containing acetronitrile, benzene, methyl ethyl ketone, and t-butanol.

9 Claims, No Drawings

TRIMETHYLOLPROPANE USE OF MACRORETICULAR POLYMERS OF TRIMETHACRYLATE FOR MAKING CHROMATOGRAPHIC SEPARATIONS

BACKGROUND OF THE INVENTION

It is known to make chromatographic separations by passing the gases of vapors of a mixture of organic substances, either alone or in a carrier gas, through a bed of solid particulate material which temporarily retains, and later releases, one or more components of the mixture. Various chromatographic methods and apparatus are disclosed in U.S. Pat. Nos. 3,156,546; 3,159,019; 3,167,946; and 3,357,158.

There is no single column packing material available on the market that is useful in separating all organic materials. Each of the available packing materials displays selective retention, and selective degrees of retention, for certain organic compounds. Therefore, the gas chromatographic art is always in search of new packing materials to expand the usefulness and capacity of gas chromatographic techniques. Accordingly, it is the object of this invention to provide the gas chromatographer with a new packing material for use in making chromatographic separations.

BRIEF SUMMARY OF THE INVENTION

According to the invention, gas chromatographic separation of mixtures of organic compounds having boiling points below about 200°C, such as acetonitrile, benzene, methyl ethyl ketone (MEK), t-butanol, and others, can be carried out using conventional gas chromatographic apparatus and techniques by passing gaseous mixtures of these organic compounds through a packed column containing finely divided particles of a porous, polar, macroreticular polymer of trimethylolpropane trimethacrylate. The finely divided particles should be of a size such that at least 65 percent, and preferably at least 70–90 percent, of the particles will pass a 60 mesh screen and be retained on a 120 mesh screen (U.S. Std.), and such that the surface area is between about 100 and 200m²/g. The packing material should have a moisture content below 1% and preferably below about 0.5 percent.

DETAILED DESCRIPTION AND PREFERRED EMBODIMENTS

The new packing material used in the present invention can be any porous, polar, macroreticular polymer of trimethylolpropane trimethacrylate, such as those disclosed in U.S. Pat. No. 3,663,467. A preferred packing material is prepared by modifying, i.e., by grinding and sizing, a macroreticular polymer available from the Rohm and Haas Company under the trademark of AMBERLITE XAD-8. This material is in the form of white, spherical beads containing no ion exchange character, packed in a sodium chloride solution to prevent bacterial growth. Typical properties of dry AMBERLITE XAD-8 are shown in Table I.

TABLE I

| | |
|---|---|
| Particle Size | 20 to 60 mesh (U.S. Std.) |
| Surface Area | 140 m²/g |
| Average pore diameter | 250 Angstrom |
| Porosity | 50–54% by volume |
| Bulk Density | 43 PCF |
| Wet Density (distilled water) | 1.05 g/cc |

The preferred packing material used in the present invention is made by washing the AMBERLITE XAD-8 spherical beads in deionized water for at least about 1½ hours to remove all of the sodium chloride solution, and drying the washed beads at about 250°F in a partial vacuum of less than 25 inches of water to reduce the moisture content to below about 0.3 weight percent. The partial vacuum is maintained until the dried material is cooled to below about 210°F to prevent degradation of the polymer.

The dried, and at least partially cooled, material is then pulverized to reduce the particle size to below about 60 mesh (U.S. Std.). Any pulverized can be used for this purpose, e.g., a MIKROPULVERIZER manufactured by the Mikro-Pulverizer Company, using herringbone slots having openings measuring 0.035 inches by 0.02 inches. The pulverized material is then screened, using any appropriate conventional screen, to produce a product having at least 65 percent of, and preferably at least 70–80 percent, minus 60 mesh plus 120 mesh (U.S. Std.) particles. If desired the particles can also be screened into narrower size ranges, e.g., minus 60 plus 80 mesh, minus 80 plus 100 mesh, minus 100 plus 120 mesh, etc.

EXAMPLE

A mixture of four organic compounds was injected into a column packed with minus 80 plus 100 mesh particles of AMBERLITE XAD-8 polymer where the mixture was vaporized and swept into the column using conventional chromatographic apparatus and techniques. Each component will travel at its own rate through the column depending on the affinity of the solute for the surface of the column material. AMBERLITE XAD-8 polymer is moderately polar, and it will retain moderately polar solutes for longer times in the column than the nonpolar solutes, under identical chromatographic conditions. The retention indices that the column displayed for the four compounds are compared in Table II with those displayed by other conventional column packing materials marketed under the trademark CHROMOSORB by Johns-Manville Corporation.

TABLE II

Column: 4 ft./3 mm. I.D. glass, 80/100 mesh
200°C, 60 ml/min. FID

| Organic Compound | Boiling Point (°C) | CHROMOSORB | | | | | | | Modified AMBERLITE XAD-8 |
|---|---|---|---|---|---|---|---|---|---|
| | | 101 | 102 | 103 | 104 | 105 | 106 | 107 | |
| Acetronitrile | 81.6 | 580 | 460 | 565 | 885 | 480 | 405 | 550 | 605 |
| Benzene | 80.6 | 745 | 650 | 720 | 845 | 635 | 605 | 660 | 710 |
| MEK | 79.6 | 645 | 570 | 650 | 860 | 580 | 540 | 650 | 675 |
| t-butanol | 82.6 | 565 | 525 | 575 | 735 | 545 | 505 | 620 | 645 |
| Polarization of the Packing Material | | Non-Polar | Non-Polar | Non-Polar | Polar | Polar | Non-Polar | Polar | Polar |

To provide a clear separation of the various organic compounds in a mixture the packing material used should produce retention indices for the various component compounds that differ by at least 25 points. As shown by the data in Table II, AMBERLITE XAD-8 met this requirement for the organic compounds tested while several of the conventional CHROMOSORB products did not. Although CHROMOSORB 102, 105, and 106 met the requirement for the spread in retention indices, each of these conventional packing materials is a non-polar material, whereas AMBERLITE XAD-8 is polar. Thus, the use of this macroreticular polymer of trimethylolpropane trimethacrylate provides the chromatographer with a new, different and useful packing material for gas chromatographic separation.

What I claim is:

1. A method of separating a mixture of organic compounds into its individual compound components by passing vapors of the mixture through a packed column of porous resin particles, the improvement comprising using porous particles of a polar macroreticular polymer of trimethylolpropane trimethacrylate as the resin particles, at least 65 percent of said particles being of a size that will pass through a 60 mesh screen and be retained on a 120 mesh screen.

2. A method according to claim 1 wherein the particles are made by pulverizing and screening polymer particles of trimethylolpropane trimethacrylate having a surface area of 140 $m^2/g$, an average pore diameter of 250 Angstroms, a porosity of 50–54 percent by volume, a bulk density of about 43 lbs./$ft.^3$, and a wet density, in distilled water, of about 1.05g/cc.

3. A method according to claim 2 wherein said porous particles have a surface area of between about 100 and about 200 $m^2/g$.

4. A method according to claim 3 wherein at least about 70 percent of the particles are of a size that will pass through a 60 mesh screen and be retained on a 120 mesh screen.

5. A method according to claim 4 wherein the porous particles are of a size that at least 80 percent will pass through a 60 mesh screen and be retained on a 120 mesh screen.

6. A method according to claim 3 wherein said porous particles contain no ion exchange character.

7. The method according to claim 6 wherein said porous particles have a moisture content of less than about 1 percent.

8. The method according to claim 7 wherein said porous particles have a moisture content of less than about 0.5 weight percent.

9. The method according to claim 8 wherein said mixture comprises acetronitrile, benzene, methyl ethyl ketone, and t-butanol.

* * * * *

UNITED STATES PATENT AND TRADEMARK OFFICE
CERTIFICATE OF CORRECTION

PATENT NO. : 3,891,412

DATED : June 24, 1975

INVENTOR(S) : Shashi Bhaishanker Dave

It is certified that error appears in the above-identified patent and that said Letters Patent are hereby corrected as shown below:

The following has been left out - this should follow after the "Abstract"

"  The invention relates to a method for making chromatographic separations and particularly to the use of porous particles of a macroreticular polymer of trimethylolpropane trimethacrylate to make a packed column.  "

Column 1, line 7, "of" should read "or"

Column 1, line 39, "70-90%" should read "70-80%"

Column 1, line 54, "Haas" should read "Hass"

Column 2, line 25, "pulverized" should read "pulverizer"

Column 2, line 26, "MIKROPULVERIZER" should be hyphenated

Column 2, line 46, "surface" should read "surfaces"

Column 3, line 18 (Claim 1) "separting" should read "separating"

Signed and Sealed this eleventh Day of November 1975

[SEAL]

Attest:

RUTH C. MASON
Attesting Officer

C. MARSHALL DANN
Commissioner of Patents and Trademarks